United States Patent [19]
Raffensparger et al.

[11] 3,765,993
[45] Oct. 16, 1973

[54] LAYUP MACHINE FOR ASSEMBLING PANELS HAVING A PAIR OF SKINS AND A CORE

[75] Inventors: Samuel L. Raffensparger; Colin D. Burgess; J. B. Crawford, all of Longwood, Fla.

[73] Assignee: Ramar Mfg. Co. of Florida, Inc., Longwood, Fla.

[22] Filed: Feb. 22, 1971

[21] Appl. No.: 117,322

[52] U.S. Cl............... 156/563, 156/566, 214/6, 214/8.5, 270/58
[51] Int. Cl... B32b 31/04, B65g 57/00, B65h 39/02
[58] Field of Search............ 156/299, 556, 558–559, 156/561, 563, 566, 570, 313, 571, 562; 214/8.5 A, 8.5 D, 8.5 R; 270/58

[56] References Cited
UNITED STATES PATENTS

| | | | |
|---|---|---|---|
| 3,483,065 | 12/1969 | O'Brien | 214/6 M |
| 3,367,823 | 2/1968 | Clausen et al. | 214/6 M |
| 3,516,653 | 6/1970 | Bland | 156/563 X |
| 3,510,381 | 5/1970 | Hollingsworth | 156/563 X |
| 3,185,610 | 5/1965 | Lincoln et al. | 156/558 X |
| 3,603,463 | 9/1971 | Billett et al. | 156/563 X |

Primary Examiner—Philip Dier
Attorney—Duckworth & Hobby

[57] ABSTRACT

A layup machine for assembling panels having a pair of skins and a honeycomb core having a table for stacking panels during assembly which table moves in a vertical direction in increments as the panels are stacked thereon and which table may be raised to remove the assembled panels. A pair of skins, such as sheets of plywood, are fed to the layup machine on knife rollers, after adhesive has been applied thereto and honeycomb core material is placed in the machine. The skins and panels are aligned relative to each other and to the table and at the same time are placed on the table so that the bottom skin will contact and become the top skin of one panel on the table, while the top skin will become the bottom skin for the next panel. Once a stack of panels has been accumulated on the table, they are removed and placed in presses for curing of the adhesive to form a stack of panels. The table is provided with a horizontal feed for removing stacks of panels and the apparatus provides for each of the dropping and aligning means to be moved out of the way for removing a stack of panels from the layup machine.

7 Claims, 23 Drawing Figures

Patented Oct. 16, 1973

INVENTORS
COLIN D. BURGESS
SAMUEL L. RAFFENSPARGER
J. B. CRAWFORD
BY Duckworth & Hobby
ATTORNEYS.

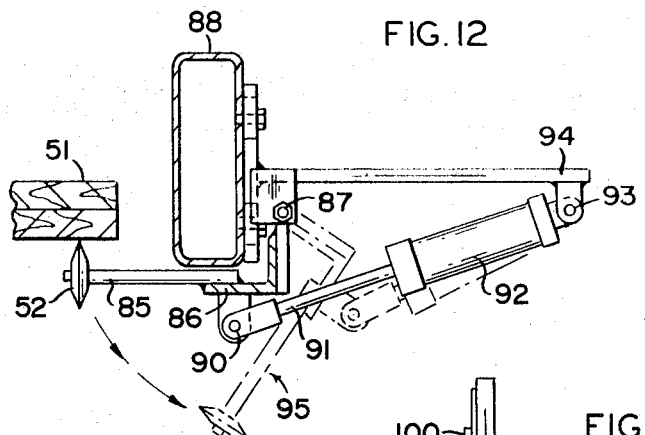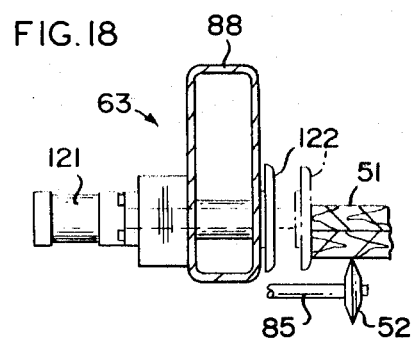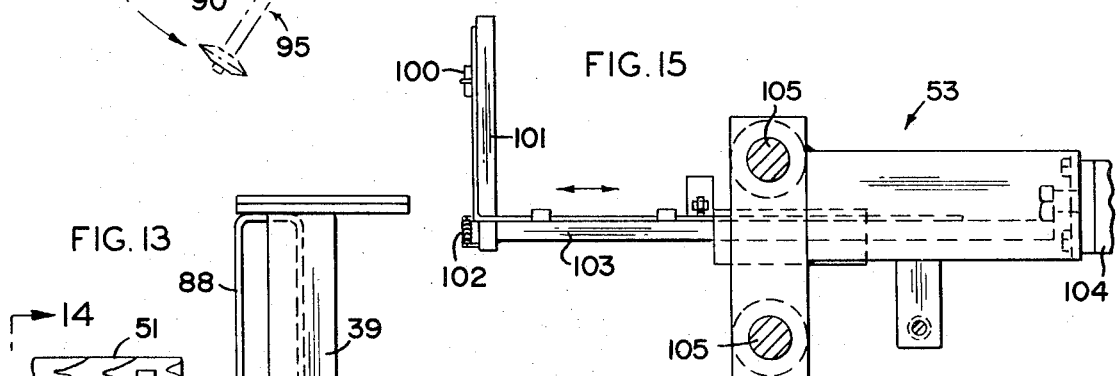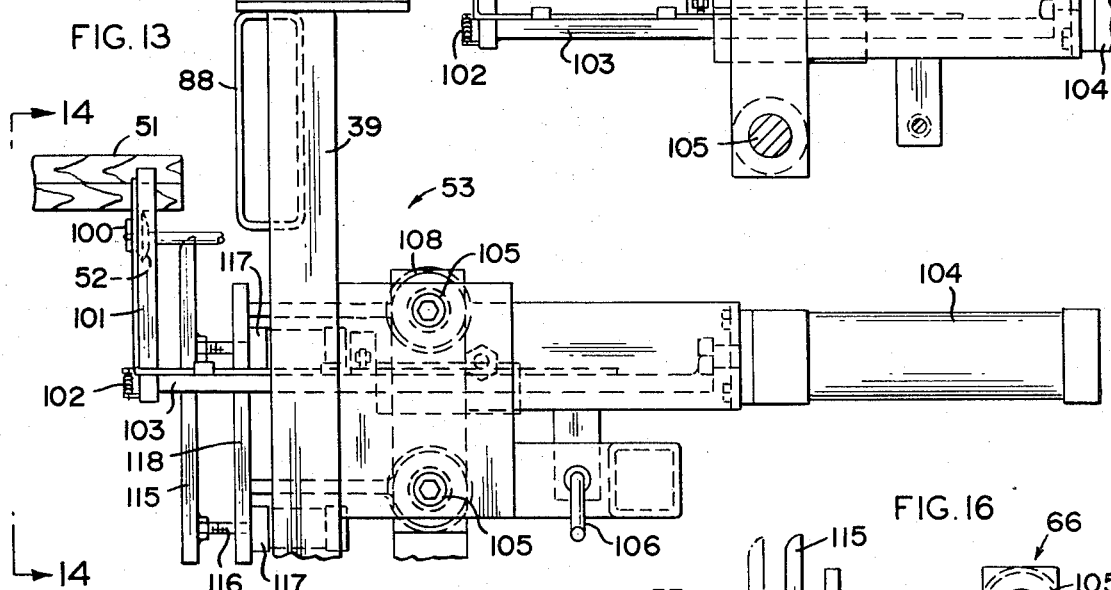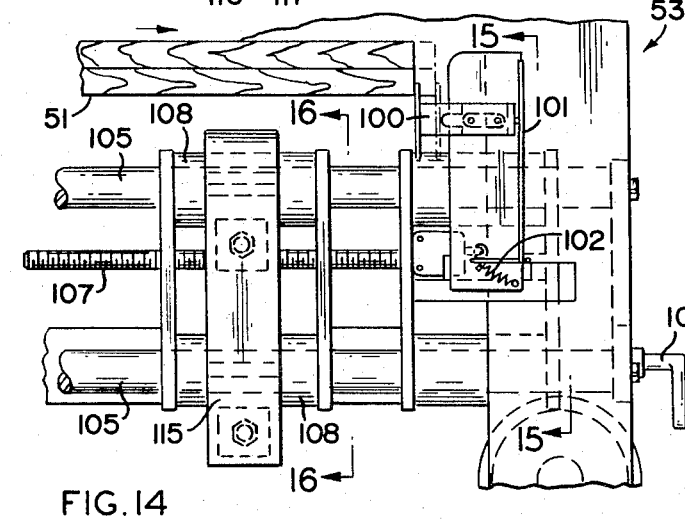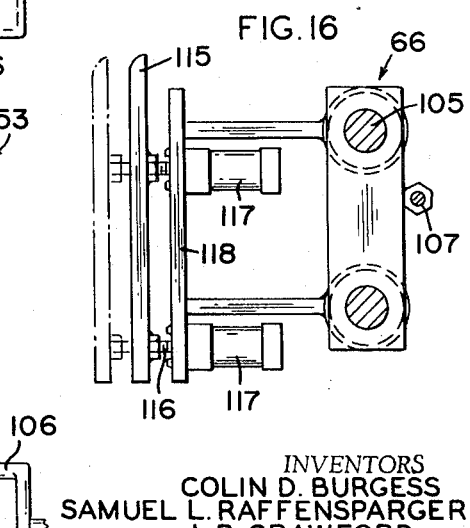

Patented Oct. 16, 1973

INVENTORS
COLIN D. BURGESS
SAMUEL L. RAFFENSPARGER
J. B. CRAWFORD

BY Duckworth & Hobby

ATTORNEYS.

LAYUP MACHINE FOR ASSEMBLING PANELS HAVING A PAIR OF SKINS AND A CORE

BACKGROUND OF THE INVENTION

The present invention relates to assembly of panels and especially to the assembly of honeycomb panels having plywood skins connected to paper honeycomb, or the like, and to a layup machine for aligning and assembling panels in a fast and accurate manner.

In the past it has been common to have various types of automated equipment for handling the assembly of the plies in plywood and also for assembling similar building components such as hollow core doors. It has also been known in the past to make various types of honeycombs and assemble these for use in airplanes, pool tables and similar flat surfaces where it is required to have surface stabilization and compressional strength. Typically, honeycomb cores are formed from thin ribbons of specially treated paper or metal or other material, which ribbons are arranged symetrically in repetitive cell-like patterns and are supported relative to each other in a continuous bonded structure. The honeycomb pattern may be of hexagonal, square or other cross-section, and the honeycomb sandwich panels are formed with these cores secured between a pair of flat surfaces, face plates or skins, and these surfaces when attached to the honeycomb may act as a prime load-bearing member providing the necessary compressional strength. The honeycomb structure permits very high strength to weight ratios with excellent stiffness, vibration dampening, thermo-electro acoustic properties over a wide range of requirements by varying the type of honeycomb core and changing the surfaces attached to the core. Honeycomb core sandwiches have more recently come into wide use as a building material for mobile and modular homes, where the advantage of being light and strong while providing insulation has proved to be a great advantage and for these latter purposes, special paper honeycombs have been developed which can be impregnated with a resin and packed with the honeycomb core material flattened or in an unexpanded position. This material can then be expanded and the resin therein cured by heating it in an expanded position for placement between a pair of surface skins. Honeycomb structure so constructed provides a relatively inexpensive yet strong panel with desirable insulation features for use in mobile homes, and the like.

The present invention relates to the use of such honeycomb cores but it will be clear that other types of cores such as expanded or foamed rigid polystyrofoam or polyurethane can be used for a core within the scope of the present invention. A wider use of this type of material makes it desirable to have more automated equipment for assembling these relatively bulky type panels for use in the construction of mobile home trades, and the like.

SUMMARY OF THE INVENTION

The present invention relates to a layup machine for assembling panels having a pair of skins and a core and to a method for assembling panels having skins attached to cores. The layup machine has a table adapted for stacking the panels during assembly into a relatively large stack of assembled panels. Pairs of skins, such as a pair of plywood boards, are selected from a stack and have adhesive applied to the top and to the bottom of the pairs so that each skin has only one surface coated with an adhesive. These panels are fed to the layup machine along with an expanded core. The panels and honeycomb cores are aligned and placed on the stack in alignment to each other and to the other panels on the stack so that the bottom skin of the pair becomes the top skin of one panel, while the top skin of the pair becomes the bottom skin of the next panel so that one core is intermittently placed in the stack for each pair of skins. As each pair of skins and core are added to the table, the table lowers itself a sufficient distance to compensate for each addition until the table is filled, at which time the layup machine is provided with means for moving the various aligning means out of the way, raising the table to a desired height and feeding the stack of panels to a press for applying pressure for curing the adhesive. Microswitches are used to activate the aligning and placing means for the core and for the pairs of plywood panels and are also used to actuate the movement of the table as each panel is added to the stack. The first and last skins are fed in as single skins to complete the stack in a balanced manner and the skins with adhesive thereon are fed to the layup machine on knifed rollers to prevent the rollers from interfering with the adhesive applied to the skins.

BRIEF DESCRIPTION OF THE DRAWINGS:

Other objects, features and advantages of this invention will be apparent from a study of the written description and the drawings, in which

FIG. 12 is a sectional view taken on the line 12—12 of FIG. 9;

FIG. 13 is a sectional view taken on the line 13—13 of FIG. 9;

FIG. 14 is a sectional view taken on the line 14—14 of FIG. 13;

FIG. 15 is a sectional view taken on the line 15—15 of FIG. 14;

FIG. 16 is a sectional view taken on the line 16—16 of FIG. 14;

FIG. 18 is a sectional view of the stationary side register;

DESCRIPTION OF THE PREFERRED EMBODIMENT

Figure 1:
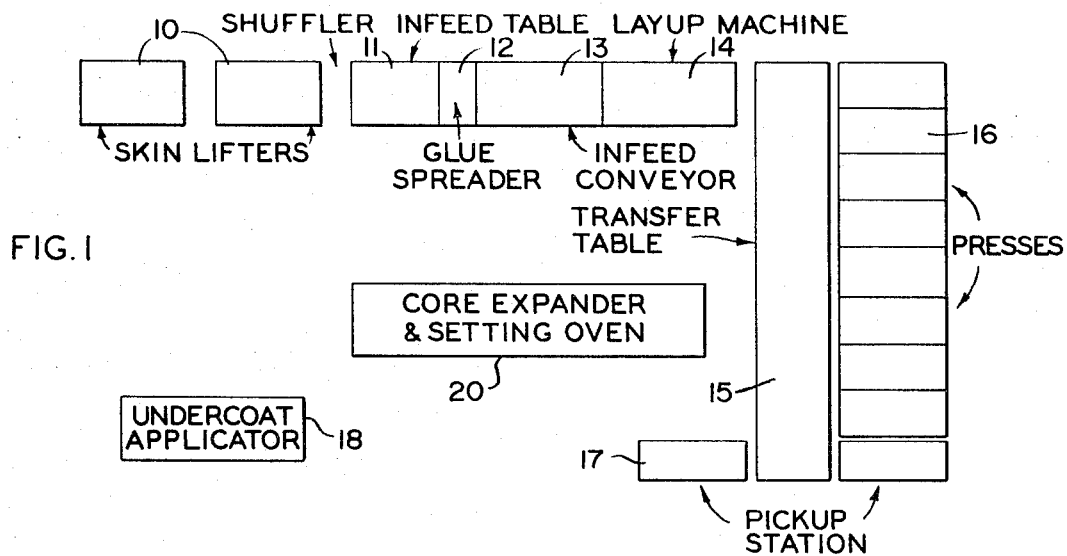
FIG. 1 shows an overall layout for the assembly of honeycomb core panels.

Referring now to FIG. 1 of the drawings, an overall layout of a system used in accordance with the present invention for assembling panels having cores and especially cores of honeycomb material is illustrated; The system begins with one or two stacks 10 of plywood, skins, such as supported on skin lifters which raise the stacks to desired levels where they can be fed to the infeed table 11 either by hand, or by dogs, or the like, engaging the top two members from the stacks 10. Two stacks are used where it is necessary to have a top and bottom skin which are different but it should be clear that one stack can be utilized where top and bottom skins are to be the same. Infeed table 11 can be a roller table having a plurality of rollers for the skins to roll on into the adhesive spreader 12. The adhesive spreader can be of any type desired but must spread adhesive on the top and bottom of the pair of skins being fed therethrough. Thus, each skin going through will have adhesive only on one surface with the bottom skin having adhesive on its bottom surface and the top skin having adhesive spread on its top surface, leaving the surface areas of the skins which are in contact without adhesive. Adhesive can be applied by roller, brush, or can be sprayed, as desired. The pair of skins after receiving their adhesive pass to the feed conveyor table 13 which feeds the skins to the layup machine 14. This table can have an elongated chain running beneath it with dogs extending up for engaging one end of a pair of panels on the feed conveyor 13 and pushing them into the layup machine 14 in a predetermined cycle. The layup machine 14 is the principle feature of the present invention and will be described in more detail in connection with FIGS. 9 through 23. At any rate, this machine takes the pair of skins having adhesive thereon, aligns them in a predetermined position, and stacks them with cores, such as honeycomb cores, engaging the surfaces having adhesive thereon. The stack is allowed to build up to a predetermined height of sandwiched cores in the layup machine, with the top of one pair of skins engaging the bottom of one honeycomb core and the bottom of the same pair of skins engaging the top of another honeycomb core to form sandwiched panels. When the stack reaches a predetermined height, the machine is adapted to allow the entire stack to be raised to a position that it can be fed to the transfer table 15 and placed in one of the presses 16 where the adhesive is cured, while the panels are compressed from approximately 4 to 6 PSI depending upon the type of adhesive. Following the curing of the adhesive, the stack of honeycomb core panels is moved from the press section to pickup station 17 where they are picked up with fork-life trucks, or the like, and loaded on trucks, trains, or the like, for shipment. An undercoat applicator station 18 is illustrated in which the panels may be undercoated on one side where such panels are to be used as a base for a trailer or camper where it is desirable to waterproof one side of the panel. The expander and core-setting oven 20 is utilized to prepare the honeycomb for feeding to the layup machine 14. The honeycomb typically used in the present invention is a paper-type honeycomb which is purchased commercially already impregnated with a resin which has not been cured. The expander 20 receives the core material where it is expanded and cured with heat and where it is cut into predetermined lengths. The cured paper honeycomb is a stiff ribboned paper honeycomb cut to a predetermined size for feeding to the layup machine during the period that the skins are being fed from the infeed conveyor 13.

Figure 2:
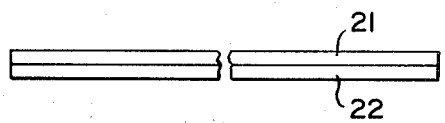
FIG. 2 is a side view of a pair of skins selected together.
Figure 3:
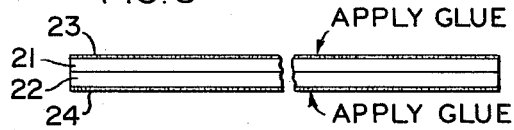
FIG. 3 shows a side view of the skins of FIG. 2 having adhesive applied to the top and bottom.
Figure 4:
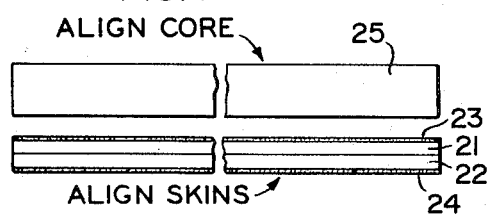
FIG. 4 illustrates the honeycomb core being applied to the top skin in alignment with the top skin.
Figure 5:
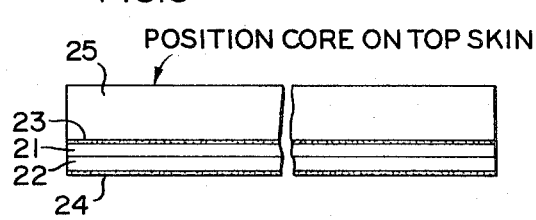
FIG. 5 is a side view of the honeycomb core following placement onto the pair of skins.
Figure 7:
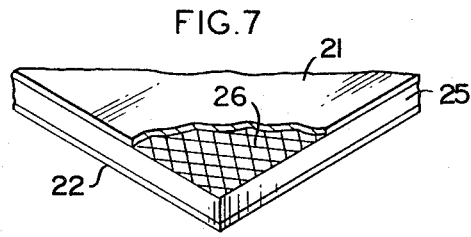
FIG. 7 is a cutaway perspective of a panel using honeycomb core.
Figure 6:
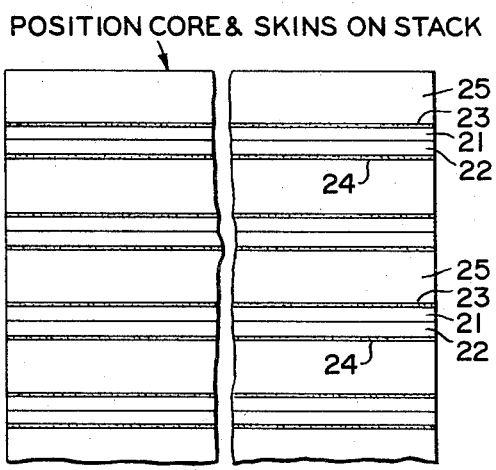
FIG. 6 illustrates a side view of a stack of cores and skins during assembly.
Figure 8:
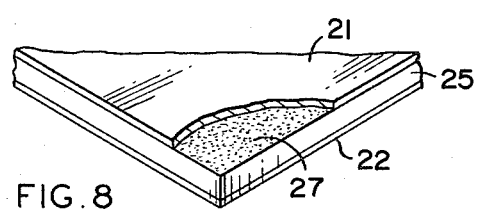
FIG. 8 is a cutaway perspective of a panel using a foamed plastic core.

Turning now to FIGS. 2 through 8. The core panels of the present invention are illustrated in different stages of assembly in which FIG. 2 illustrates a pair of skins 21 and 22 which may be plywood, particle board, or the like, and which have been removed from the stacks 10. FIG. 3 illustrates the same skins 21 and 22 having adhesive 23 applied to the upper surface of panel 21 and adhesive 24 applied to the bottom of lower panel 22. FIG. 4 shows the skins 21 and 22 having adhesive 23 and 24 applied thereto and having them properly aligned with a core 25 which could be honeycomb core which had been properly expanded in the expander 20 of FIG. 1. FIG. 5 illustrates core 25 which had been aligned with skins 21 and 22 in FIG. 4, actually being applied or stacked on skin 21 in contact with the adhesive 23. FIG. 6 illustrates a plurality of skins 21 and 22, along with cores 25, each having adhesive 23 and 24, illustrating how a bottom skin 22 engages the top of a honeycomb core while the top skin 21 engages the bottom of the honeycomb core 25. FIG. 7 illustrates a broken-away portion of a skin 21 showing the core 25 as having a honeycomb structure 26 attached to skins 21 and 22, while FIG. 8 illustrates the skins 21 and 22 attached to a core 25 but having a different structure 27 which could, for instance, be a foamed plastic such as a foamed rigid polyurethane or polystyrene material, which materials along with honeycomb have been shown to provide lightweight panels of great strength.

Figure 9:
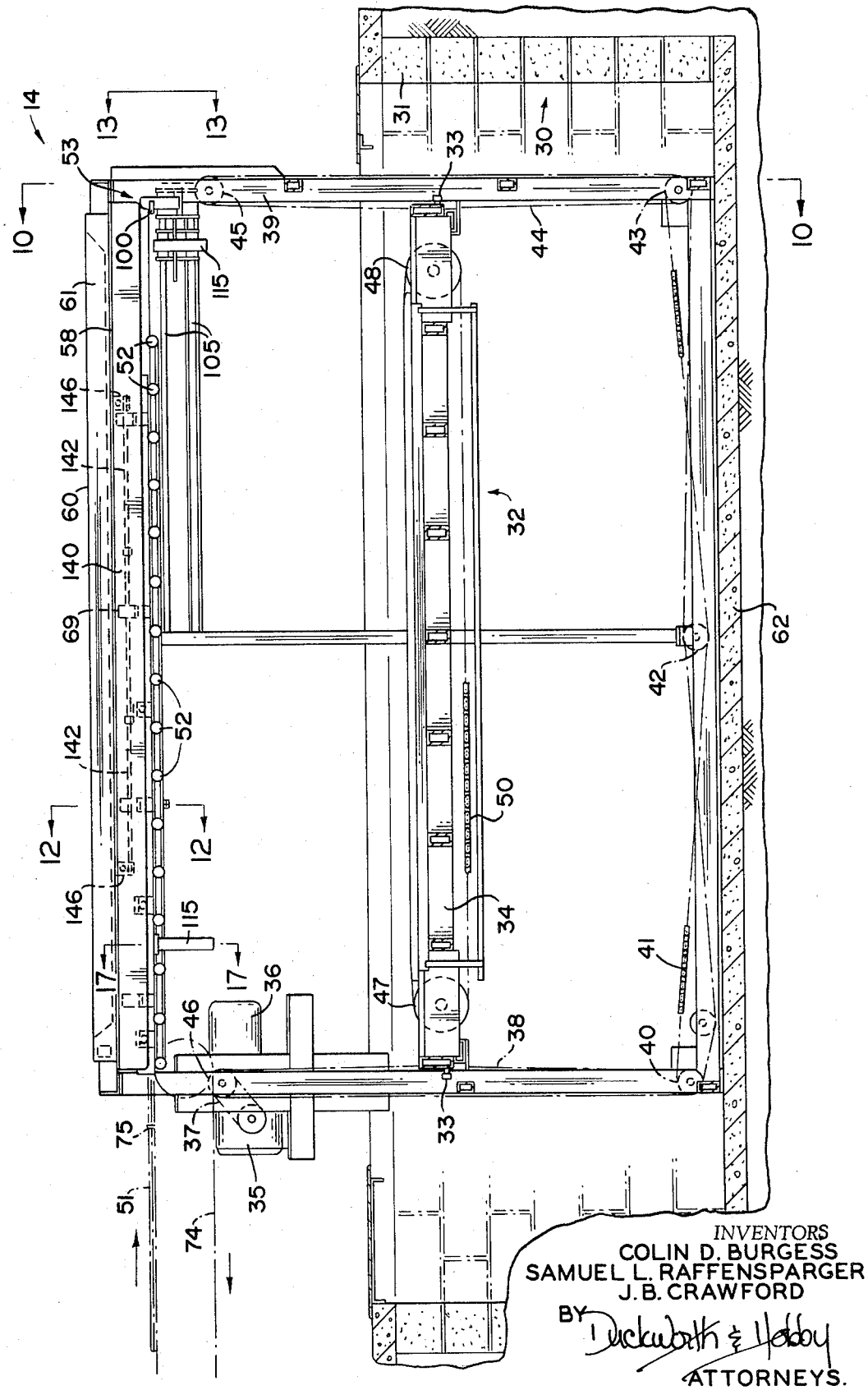
FIG. 9 is a side sectional view of the layup machine in accordance with the present invention.

Turning now to FIGS. 9 through 23, and especially to FIG. 9, a sectional view of the layup machine 14 is shown installed in a sunken area 30 having block walls 31, and a framework 39 which frame members may be of tubular steel or similar commercial stock welded or bolted together into a frame for the layup machine 14. A table 32 rides and is guided along frame 39 by cam follower members 33 connected to table frame 34 and which rolls along frame member 39 to guide the table in proper alignment as it rides up and down vertically within the frame 39 of layup machine 14. Table 32 is driven by motor 35 which is geared down by gear box 36 from 1725 rpm to 9 rpm and which drives a chain 37, which in turn drives a chain 38 connected to one end of the table 32. Chain 38 also rides on a sprocket 40 which engages a bottom chain 41 riding over an idler 42 and engaging a sprocket 43 which in turn drives a chain 44 on the opposite end of the layup machine 14 from chain 38. Chain 44 engages the layup table at the opposite end and rides in a sprocket 45 similar to a sprocket 46 driving chain 38. Thus, a single drive motor 35 drives chains and sprockets at both ends of the table 32 for raising the table up or down whenever the motor 35 is actuated. Table 32 has frame 34, which may be welded tubular steel, has a pair of sprockets 47 and 48 at either end thereof with a chain 50 riding thereon across the frame 34. Driving this chain 50 allows a stack of panels that have been aligned and stacked thereon to be removed when the layup machine is fully loaded by raising the table 32 to the top of the walls 31 and driving the chain 50 to slide or move the stack of assembled panels onto the transfer table. In the present operation a slug or dummy panel is stacked directly on the chain portions 50 so that the panels being stacked won't be damaged by the chains in the operation of the table 32. In operation the table 32 will begin at the top of the machine 14 and will accept pairs of skins having adhesive spread thereon stacked intermittently with honeycomb cores and as each one is stacked, motor 35 is driven momentarily to move table 32 a sufficient distance downward to accept the next skins and cores. This is continued until the table 32 reaches the bottom of the machine 14 at which time a microswitch or photocell can warn that the bottom is being reached, if desired, and the motor 35 driven to raise the table 32 in line with the top of the wall 31. A pair of skins 51 having adhesive thereon is shown being fed to the layup machine 14 which skins will ride on a plurality of knifed rollers 52 which knife rollers prevent undue interference with the adhesive on the skins 51. Panels 51 are fed across the knife rollers 52 until they reach a stop assembly 53 which includes a front register bar and a microswitch for actuating the alignment operations of the layup machine 14 and which stop mechanism will be described in more detail in connection with FIGS. 13 and 15.

Figure 10:
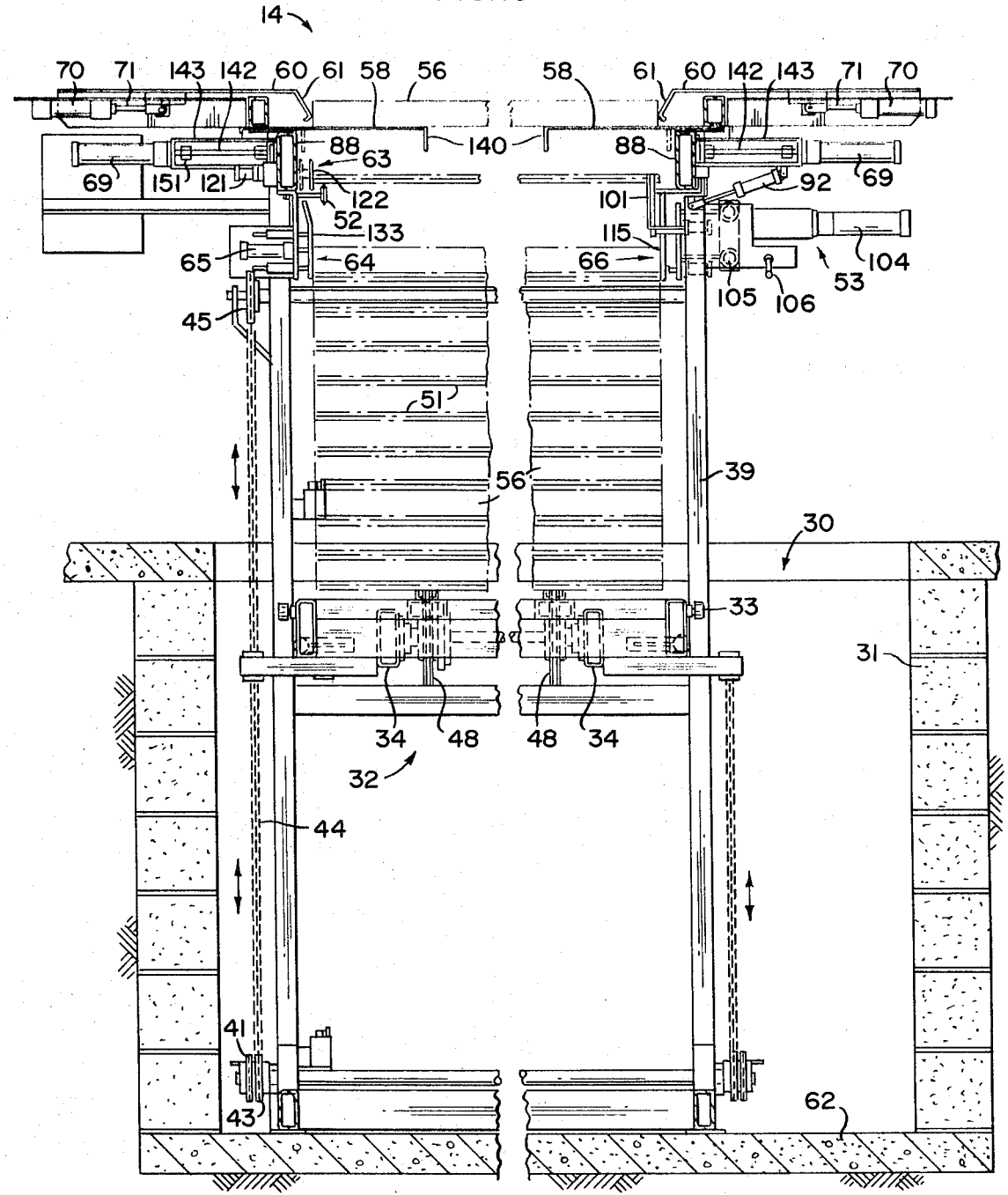
FIG. 10 is a sectional view taken on the line 10—10 of FIG. 9.

FIG. 10 shows one end of the layup machine 14 and more clearly illustrates the operation of the machine as having a pair of skins 51 riding on the knifed rollers 52 and with the layup table 32 having stacks of skins 51 intermittently stacked with cores 56. In addition, this view has the honeycomb core 56 riding on the bottom pans 58 which have been aligned in position by top pans 60 having an angled end portion 61 for guiding cores 56 into proper position on the pans 58. Cores 56 of the present machine are hand-loaded even though it should be clear that they could be fed automatically if desired, without departing from the spirit and scope of the present invention. At the present time it has been found that a single operator can operate the machine and can in conjunction with operating it, feed cores 56 into the machine. This view also illustrates walls 31 fastened to a concrete base 62 to form the pit area 30 and having the side frame members 39 guiding the table 32 by the guide rollers 33 and showing the chains 44 connected to sprockets 43 along with chain 41 driving the table 32 in a vertical direction. In the operation of the present machine, honeycomb 57 can be placed on pan 58 and aligns itself in accordance with the angled surfaces of pans 60. A pair of skins 51 is fed on the knife rollers 52 until it contacts the stop assembly 53. Guide bars 63 are used to guide the skins 51 as they are being fed on the knife rollers 52. At this point, the skins 51 are dropped by the rollers 52 which are dropped out of the way to allow the skins 51 to drop onto a core 56 on the top of the stack and which are aligned by a register 64 which is driven by pneumatic cylinder 65 driving skins 51 while skins 51 are being placed onto the stack of panels against the stationary side registers 66 on the opposite side of the layup machine. Simultaneous with this operation, the bottom holding pans 58 are actuated by cylinders 69 to be pulled back by members 142 to drop the core 56 onto the top of the pair of skins 51 on the stack of panels. Cylinder 69 is held by bracket 143 to the frame 39. The top pans 60 remain in a fixed position during the operation until the stack is completed, at which time they must be pulled back by cylinders 70, driving rods 71 connected to the pans 60 so that the stack of panels can be raised for removal from the machine 14. The actuation of the cylinder 69 along with the holding pans 58 and the dropping of the knife rollers 52 and the movement of alignment register 64 are actuated by stop assembly 53 which will be described in more detail in connection with FIGS. 15 and 13.

Figure 11:
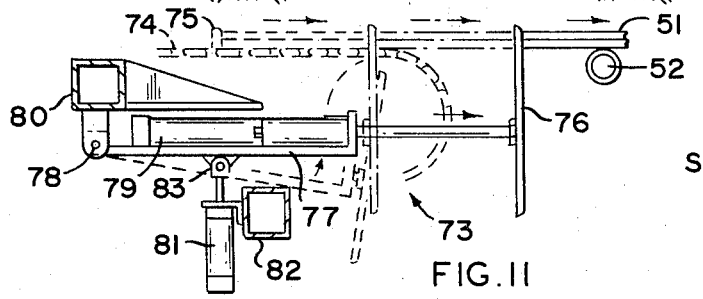
FIG. 11 illustrates a sectional view of the active portion of the end alignment mechanism for use in accordance with the layup machine of FIGS. 9 and 10.
Figure 17:
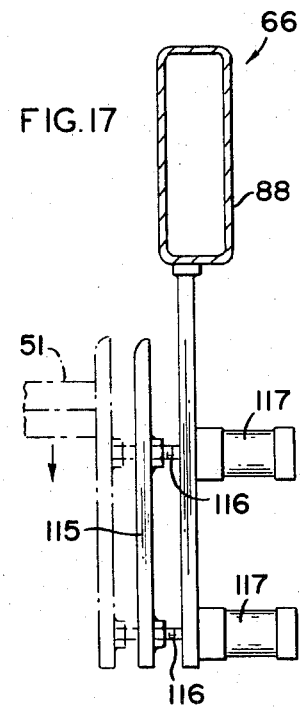
FIG. 17 is a sectional view taken on the line 17—17 of FIG. 9.

FIG. 11 illustrates the register 73 which is used to drive the skins 51 the last few inches on knife rollers 52 into the layup machine 14. A chain drive 74 with dogs 75 feeds the skins from the infeed conveyor 13 of FIG. 1 into the layup machine which still needs to be driven the last few inches so that the skins engage properly with the stop assembly 53 of FIG. 9. This end register includes pneumatically driven cylinder 79 having the end register driving portions 76 for engaging the panels 51. Cylinder 79 is attached to bracket 77 which is attached by pins 78 through a frame portion 80. A second pneumatic cylinder 81 attached to frame member 82 and pinned to bracket 77 by pin 83 allows the end driving portions 76 to drop out of the way until the skins 51 have been fed a sufficient distance into the layup machine.

Turning now to FIG. 12, the operation of the knife rollers 52 is shown having a pair of skins 51 riding thereon. Each knife roller rides on a shaft 85 which is attached to a bracket 86 which bracket has a plurality of shafts 85 attached thereto and which is pinned or hinged on a shaft 87 running the length of the bracket 86. Thus a plurality of knife rollers 52 on one side of the layup machine are movably connected to an upper frame member 88 with brackets 86 pinned with a pin 90 to cylinder rod 91 of a pneumatic cylinder 92. Cylinder 92 is pinned with a pin 93 to a support bracket 94. When activated the knife rollers 52 must drop out of the way as illustrated in a phantom view 95. A single pneumatic cylinder 92 on one side activates a bracket 86 which drops all of the knife rollers 52 simultaneously with their respective shafts 85 on each side of the layup machine. This not only drops the pair of skins 51 onto the stack of panels but also removes the knife rollers 52 and shafts 85 out of the way when the entire stack of panels is being removed from the layup machine.

FIGS. 13, 14 and 15 illustrate in more detail the stop assembly 53 of FIG. 9, in which a pair of skins 51 have been fed on knife rollers 52 into the layup machine having an upper frame 88 and corner post frame members 39 until the skins 51 engage a microswitch 100 attached to a microswitch bar 101 having a spring 102 attached thereto and riding on a retracting register bar 103. The retracting register bar 103 is retracted by pneumatic cylinder 104 when removing the bar 101 out of the way for removing a stack of assembled panels and back into position for the operation of the assembly of the panels. Thus, the skins 51 are driven by the assembly of FIG. 11 into engagement with the microswitch 100 of the front registry assembly 53 which microswitch 100 starts the operation of driving the motor 35 of FIG. 9 to lower the table 32 and also to drop the knife rollers 52 to drop the skins 51 to retract the core holding pans 58 to drop the cores to activate the register 64 for the side alignment of the skins being dropped so that the skins are all properly positioned endwise and sidewise by the front register operation in conjunction with the back pusher and the side registers during the operation of placing the skins onto the stack of panels being assembled. The front register assembly 53 rides on a pair of rods 105 which can be driven by crank 106 along the length of the machine 14 for adjusting the position of the microswitch 100 for different size skins 51. Crank 106 drives a threaded shaft 107 engaging threaded sleeves 108 for proper alignment of microswitch 100. The stationary side register bar 115 can also be seen in this view as being adjustably alignable by threaded members 116 and being attached to cylinders 117. Cylinders 117 are needed only to remove the stationary register bar 115 out of the way during raising of a completed stack of panels for removal from the layup machine 14.

FIG. 16 more clearly illustrates the stationary register assembly 66 having a stationary register bar 115 riding on guides 116 and driven by a pair of pneumatic cylinders 117 which are held to a frame 118 and which ride on the rods 105 along with the end register assembly 53, in the case of the last of the stationary registers on the layup machine. However, several of these registers are placed along one side of the layup machine and the others do not have to be movable on bars 105, such as is required of the end assembly which needs to be near the stop position of the microswitch 100 for aligning the end portion of the skins 51. A stationary side register 66 may be seen in FIG. 17, which figure illustrates the register located between the ends of the layup machine 14 and having the cylinders 117, driving rods 116 to drive the register bars 115 against the skins 51 which are riding on the knife rollers 52.

FIG. 18 illustrates the guide bar assembly 63 which guide the skins 51 while being fed into the layup machine on the knife rollers 52 as attached to the upper frame 88 and has a pneumatic cylinder 121 which drives a guide bar 122. It should be understood that this cylinder 121 drives the side register assembly 63 front bar portion 122 only when the stack is ready to be removed from the layup machine. At all other times during the operation of the layup machine, this assembly remains fixed for guiding one side of the skins 51.

Figure 19:
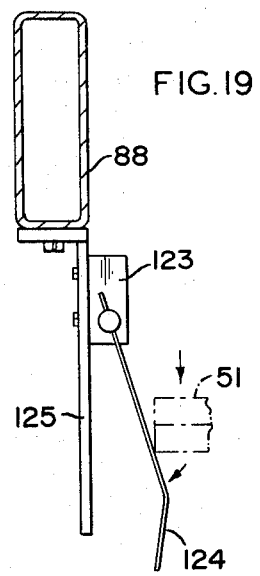
FIG. 19 is a sectional view of the microswitch for activating the table of the layup machine.
Figure 20:
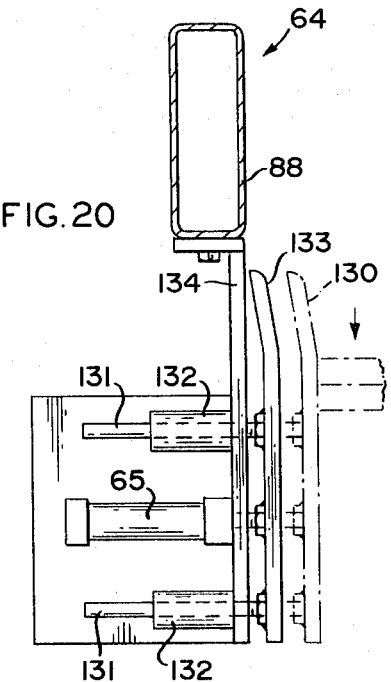
FIG. 20 is a sectional view of one side of the side register assembly.

FIG. 19 illustrates a second microswitch 123 having a contact or feeler 124 which measures when the pair of skins 51 is dropped past a predetermined point pushing the contact 124 back and activating the microswitch 123 which is connected to a bracket 125. This microswitch stops the operation of motor 35 and stops the lowering of the table 32 in the layup machine. FIG. 20 shows the operation of the movable or push register side assembly 64 having a pneumatic cylinder 65 for driving and aligning bar 130 which has aligning shafts 131 sliding in sleeves 132 to guide the bar 130 in proper alignment for aligning the skins 51. Bar 130 has an upper curved portion 133 and the assembly 64 is attached to a bracket 134 which in turn is attached to the upper frame members 88. This assembly operates directly opposite the assembly of FIG. 17 and drives the panels against the stationary side registers of FIG. 17. In addition to moving to align skins 51, cylinder 65 can activate the assembly 64 to remove the bar 130 out of the way during the removal of a stack of assembled panels from the layup machine.

Figure 21:
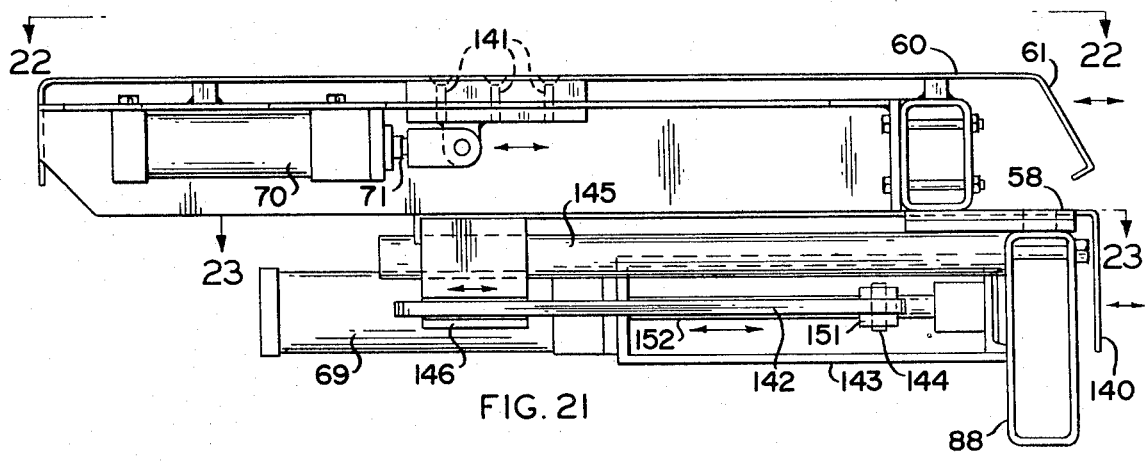
FIG. 21 is a sectional view of the core aligning and dropping pans.
Figure 22:
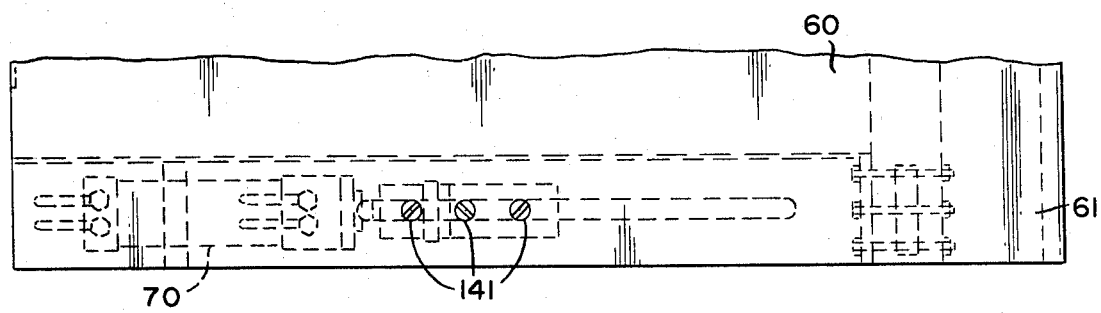
FIG. 22 is a sectional view taken on line 22—22 of FIG. 21.
Figure 23:
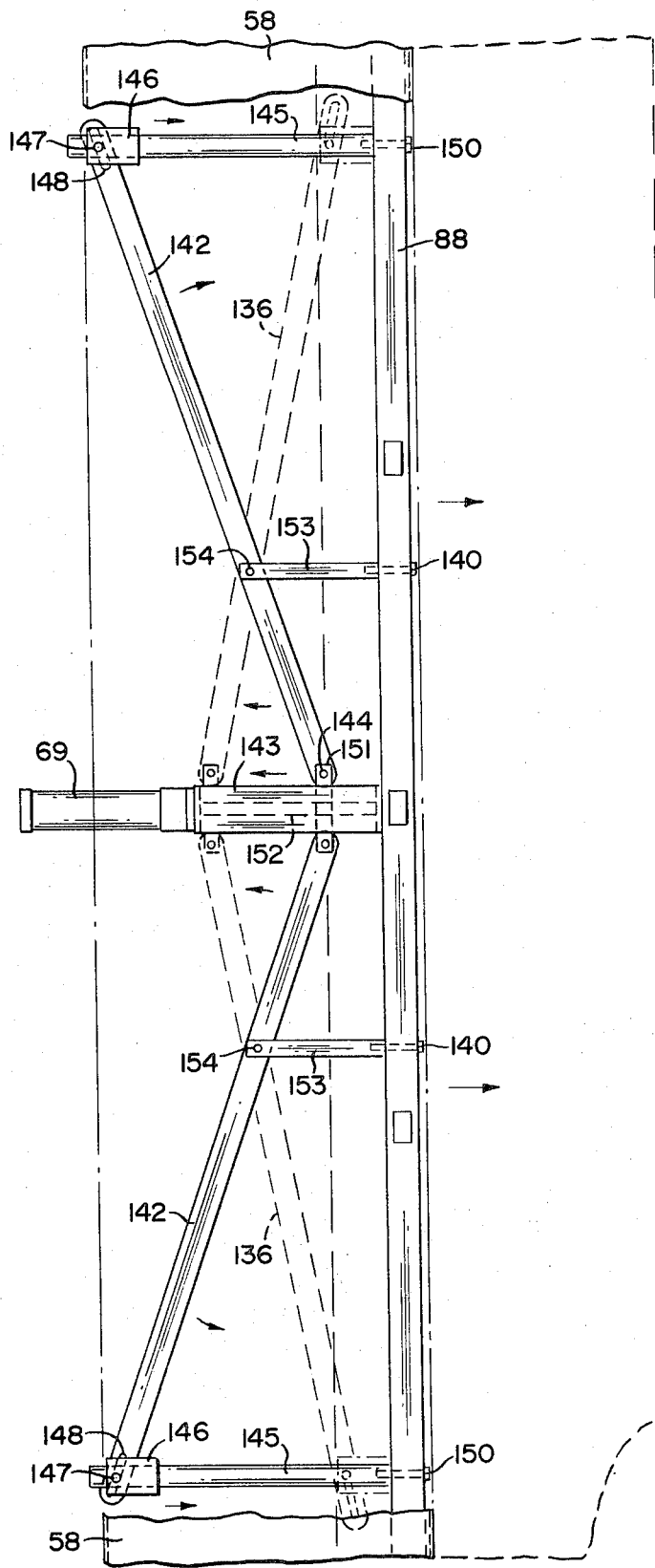
FIG. 23 is a sectional view taken on line 23—23 of FIG. 21.

Referring now to FIGS. 21, 22 and 23, the operation of the upper and lower holding pans is illustrated in which the upper pan 60 is driven by pneumatic cylinder 70 and has the angled end portion 61 for guiding the core into the holding pans. The lower pan 58 is attached to the upper frame member 88 and is driven by pneumatic cylinder 66 for releasing the core in proper sequence. Lower pan 58 has a perpendicular end portion 140 and the upper pan 60 has three screws 141 for adjusting this pan horizontally for different sizes or tolerances in the honeycomb core. Cylinder 70 is actuated only when a full stack of panels is being removed from the layup machine and remains stationary during the normal operation of assembling the panels. Cylinder 66, on the other hand, drives a scissors-like mechanism having bars 142 connected to members 143, by pins 144, and also to alignment shafts 145 in a slidable manner by sleeves 146 having pins 147 engaging slots 148 of members 142. Shafts 145 are bolted to frame 88 by bolts 150 and members 142 are connected together by connecting members 151 which slides in member 143 when pneumatic cylinder 65 is actuated to move the rod 150 as shown in a phantom view of members 142 of FIG. 23. Members 153 are also pinned to members 142 and bolted at 140 to the framework 88 so that members 142 act as levers fulcrummed on members 153 at pinpoints 154 for actuation of the cylinder 65 pulling the members 151 causing sleeves 146 to slide on shafts 145 driving the pan 58 to release the skins 51. Thus, a single pneumatic cylinder 65 moves the entire pan 58 on each side to release the core at the desired point when the end register 53 engages a pair of skins by contact with the microswitch 100. These pans 58 are also adapted to be pulled out of the way for remving stacks of assembled panels and each operation is simultaneously actuated by the microswitch 100 along with the microswitch 123 during the assembly of the panels. A completed stack of panels on table 32 can be removed by raising table 32, retracting core positioners 60, retracting core holders 58, dropping the knife rollers 52, backing off the stationary side register 66 and the driving side registers 64, retracting the side skin guides 63 and moving back the front register bar 101; then activating the chain 50 on the bottom of table 32 to move the stack of panels out of the layup machine and onto presses for applying pressure for curing the stack.

The present invention has been described in terms of a preferred embodiment, but it will be clear to those skilled in the art that other embodiments are contemplated such as automatically feeding the cores to the pans for alignment, or using hydraulic rather than pneumatic cylinders, and it should also be realized that the present layup machine can be utilized in connection with the other portions of the assembly operation illustrated in FIG. 1 to more fully automatic the assembly of panels.

Accordingly, the present invention is not to be construed as limited to the particular forms disclosed herein since these are to be regarded as illustrative rather than restrictive.

I claim:

1. A layup machine for assembling panels having a pair of skins and a core comprising in combination:

a. a frame;

b. table means movably attached to said frame for riding vertically up and down in said frame and for attaching assembled panels;

c. first aligning means connected to said frame over said table means for aligning pairs of skins for placement on said table means;

d. second aligning means connected to said frame over said table means for aligning core material for placement on said table means interlaid between said pairs of skins;

e. first supporting and releasing means connected to said frame for supporting said skins during alignment thereof by said first aligning means and for releasing said skins onto said table means;

f. second supporting and releasing means connected to said frame for supporting said core material during alignment thereof by said second aligning means and for releasing said core material onto said table means;

g. each pair of skins being fed horizontally on said first supporting and releasing means and includes microswitch actuating means connected to said frame for actuating both said first and second supporting and releasing means upon contact of said pair of skins with a stop attached to said frame, whereby a stack of skins and core material may be stacked in alignment with each other.

2. The apparatus in accordance with claim 1 in which said table means includes and means for moving said table a distance approximately equal to the thickness of a pair of skins and one layer of core material, each time said first and second supporting and releasing means places a pair of aligned skins and a layer of of core material thereon.

3. The apparatus in accordance with claim 2 in said microswitch movement of said table is activated by a microswitch attached to said frame and which is tripped by said skins and core on said table.

4. The apparatus in accordance with claim 3 in which said first supporting and releasing means includes knifed rollers for feeding said pairs of skins into said layup machine, said knifed rollers being adapted to drop out of the way to release each pair of skins onto said table.

5. The apparatus in accordance with claim 4 in which said second supporting and releasing means includes retractable holding means for holding said cores and which retract simultaneously with the dropping of said knifed rollers to allow said core to drop onto said table.

6. The apparatus in accordance with claim 5 in which said table means includes means for moving said stacked panels horizontally for removing said stacked panels from said table.

7. The layup machine in accordance with claim 6 including means for moving said first and second aligning means and said first and second supporting and releasing means out of the way during lifting of said table with said stack of panels thereon for removal of said panels therefrom.

* * * * *